United States Patent [19]
Orosz et al.

[11] Patent Number: 6,063,162
[45] Date of Patent: May 16, 2000

[54] METHOD OF SEPARATING CHLORINE FROM A MIXTURE OF GASES

[75] Inventors: Paul J. Orosz, Amherst; Robert L. Zeller, Youngstown; Ronald B. Kaplin, Lewiston, all of N.Y.

[73] Assignee: Occidental Chemical Corporation, Dallas, Tex.

[21] Appl. No.: 09/218,889

[22] Filed: Dec. 22, 1998

[51] Int. Cl.[7] ................................................ B01D 53/14

[52] U.S. Cl. .............................................. 95/182; 95/233

[58] Field of Search ........................ 95/182, 233; 423/241

[56] References Cited

U.S. PATENT DOCUMENTS 5,308,383  5/1994  Rowe ......................................... 95/182
5,437,711  8/1995  Kaplin et al. ............................. 95/182

*Primary Examiner*—David A. Simmons
*Assistant Examiner*—Chester T. Barry
*Attorney, Agent, or Firm*—Anne E. Brookes; Richard D. Fuerle

[57] ABSTRACT

Disclosed is a method of removing chlorine from a mixture of gases. The mixture of gases is contacted with dichlorotoluene, whereby chlorine in the mixture of gases is absorbed by the dichlorotoluene. The dichlorotoluene is separated from the mixture of gases and is heated to desorb the chlorine and separate it from the dichlorotoluene.

22 Claims, 1 Drawing Sheet

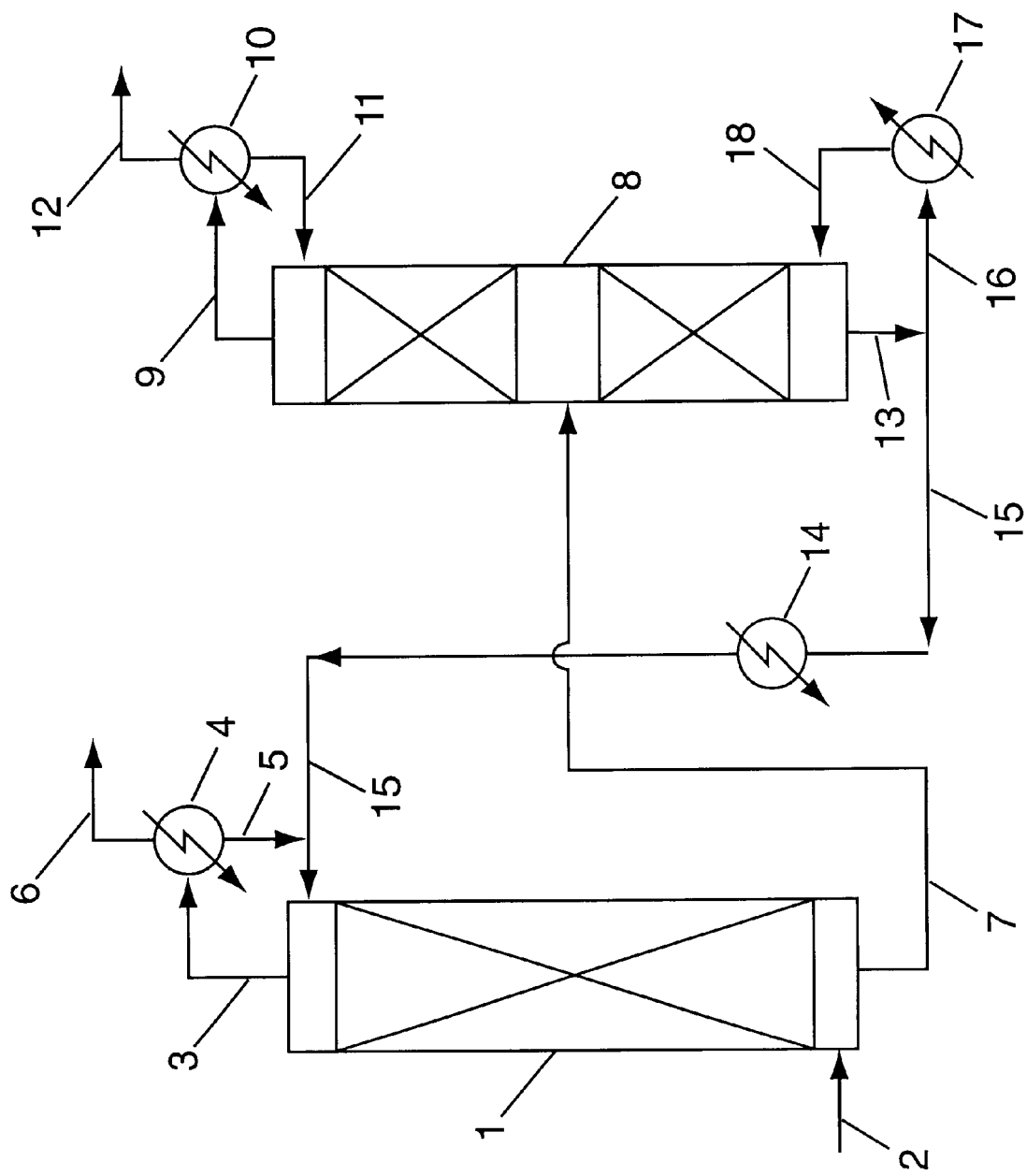

METHOD OF SEPARATING CHLORINE FROM A MIXTURE OF GASES

BACKGROUND OF THE INVENTION

This invention relates to a method of separating chlorine from a mixture with other gases. In particular, it relates to contacting such a mixture with dichlorotoluene, which absorbs the chlorine.

Chlorine is shipped as a pressurized liquid in tank cars. Customers use the chlorine by typically forcing it out of the tank cars with air or nitrogen pressure. When the tank cars are returned to the chlorine manufacturer, they are filled with gases which contain some of the chlorine that was not removed. Gas mixtures that contain small amounts of chlorine and relatively harmless other gases also come from barges, plant vents, and other sources, and are known as "vent gases" or "blow gases." Because these gases contain chlorine they cannot be vented to the atmosphere.

Vent gases can be passed through an absorber column where the gas contacts liquid carbon tetrachloride. The carbon tetrachloride absorbs the chlorine and the chlorine-free air can then be vented to the atmosphere. The carbon tetrachloride containing the absorbed chlorine is heated to vaporize the chlorine. The vaporized chlorine is liquefied and recovered and the carbon tetrachloride, now free of chlorine, is recycled to the absorber column.

The problem with this chlorine recovery process is that small amounts of carbon tetrachloride vaporize and are vented to the atmosphere with the air. Because regulatory agencies have determined that carbon tetrachloride is an ozone depleter, the use of carbon tetrachloride as a chlorine absorber is no longer permitted and other solvents are now being used for this purpose. See, for example, U.S. Pat. Nos. 5,308,383 and 5,437,711, herein incorporated by reference.

SUMMARY OF THE INVENTION

We have discovered that dichlorotoluene (DCT) is particularly useful in absorbing chlorine from a mixture of gases. Of the organic solvents examined, DCT had the highest chlorine recovery (i.e., the lowest chlorine loss) and the lowest venting of solvent (i.e., the lowest loss of DCT). In addition, DCT reacts extremely slowly with chlorine under the conditions of chlorine recovery, is a low fire hazard, is non-ozone depleting, and has a low viscosity.

BRIEF DESCRIPTION OF THE DRAWINGS

The accompanying drawing is a diagram illustrating a certain presently preferred process according to this invention.

DESCRIPTION OF THE PREFERRED EMBODIMENTS

In the drawing, a gas mixture containing chlorine and other gases enters the bottom of absorber column 1 through gas inlet 2. The gas mixture is preferably cooled to about −10 to about 40° F. (about −23.3 to about 4.4° C.). It passes up through the inert packing material, e.g., Berl saddles, Raschig rings, etc., in column 1 where it encounters downward-flowing DCT. The intimate contact between the gas mixture and the DCT results in the absorption of the chlorine in the gas mixture by the DCT. The chlorine-free gas mixture passes from column 1 through line 3 to condenser 4, where DCT is condensed. The condensed DCT returns to column 1 through line 5 and the chlorine-free gas leaves condenser 4 through gas outlet 6.

DCT containing absorbed chlorine leaves column 1 through liquid outlet 7 and passes to stripper 8. In stripper 8, the DCT is heated to desorb or volatilize the absorbed chlorine. Alternatively, the pressure on the DCT can be reduced to flash off the chlorine. The vaporized chlorine passes out line 9 to condenser 10 where DCT is condensed. The condensed DCT returns to stripper 8 through line 11 and the chlorine gas leaves through chlorine outlet 12, where it is collected. The DCT, now chlorine-free, leaves stripper 8 through DCT outlet 13. Some of this DCT is cooled in cooler 14, and is recycled to column 1 through DCT line 15. The remainder of the DCT in line 13 is sent through line 16 to reboiler 17 where it is heated and returned to stripper 8 through line 18.

Gases that can be treated using the process of this invention may contain any amount of chlorine. However, if the gas contains more than about 60 wt % chlorine, it is generally more economical to remove most of the chlorine by cooling and compressing the gas to liquefy the chlorine. Thus, a typical vent gas treated according to this invention will contain about 1 to about 45 wt % chlorine. The remainder of the gases in the vent gas are typically nitrogen, oxygen, carbon dioxide, and hydrogen. If moisture is present in the vent gas, it can be removed by scrubbing with sulfuric acid prior to recovery.

The DCT may be 2,3-DCT, 2,4-DCT, 2,5-DCT, 2,6-DCT, 3,4-DCT, or a mixture thereof. The preferred isomer is 2,4-DCT as it is commercially available, but a mixture of isomers is also preferred as it is also commercially available and is less expensive. For example, DCT made by chlorinating p-chlorotoluene (PCT) results in a mixture of predominately 2,4-DCT and 3,4-DCT and DCT made by chlorinating o-chlorotoluene results in a mixture of predominately 2,4-DCT, 2,6-DCT, and 2,3-DCT. It may also be desirable to use a mixture of DCT with another liquid.

Sufficient DCT should be used to absorb all of the chlorine that is present so that no chlorine is vented to the atmosphere. The solubility of chlorine in DCT is about 6.5 wt %, but saturation of the DCT should be avoided. It is therefore preferable to use sufficient DCT so that the chlorine it absorbs is between about 20 and about 75% of saturation. If the chlorine content exceeds 75% of saturation, there is a danger of chlorine not being entirely absorbed and leaving in the vent gas. If the chlorine content of the DCT is less than 20% of saturation, energy is wasted in heating the excess DCT in the stripper. The most preferred range is about 40 to about 60% of saturation.

The temperature at the bottom of the stripper is preferably at the boiling point of the DCT while the temperature at the top of the stripper is preferably about 0° F. (−18° C.). Thus, the DCT boils at the bottom of the stripper, but condensation of the DCT occurs as it moves up the stripper so that at the top of the stripper the vapors are almost entirely free of DCT.

The following example further illustrates this invention.

EXAMPLE

Using a chemical process simulation program sold by Aspen Technology, Inc., the process shown on the accompaning drawing was simulated. Toluene, PCT, OCT, ethylene dichloride (EDC), p-chlorobenzotrifluoride (PCBTF), and carbon tetrachloride ($CCl_4$) were compared to 2,4-DCT. In the simulation, 16,000 lbs/hr (7257 kg/hr) of solvent at about 0° F. (−18° C.) and 105 psi (724 kPa) in a loop was passed down through an absorber column where it contacted a rising flow of 4080 lbs/hr (1851 kg/hr) of 40° F. (21° C.) vent gas of 10.2 wt % chlorine, 25.3 wt % nitrogen, 55.5 wt % oxygen, 8.9 wt % carbon dioxide, and 0.2 wt % hydrogen. The solvent from the bottom of the absorber column was sent to a stripper, where it was heated to its boiling point at the bottom of the stripper. At the top of the stripper was placed 100 lbs/hr (45.4 kg/hr) of cold chlorine or chlorine reflux to the top plate of the stripper. Solvent from the stripper was recycled to the absorber column. The following table gives the results:

|  | Toluene | PCT | OCT | 2,4-DCT | EDC | PCBTF | $CCl_4$ |
|---|---|---|---|---|---|---|---|
| Solvent in Chlorine Product |  |  |  |  |  |  |  |
| (lbs/hr) | 2.5 | <0.001 | <0.001 | 0.31 | 0.08 | 1.58 | 0.01 |
| (kg/hr) | 1.1 | <0.0005 | <0.0005 | 0.14 | 0.04 | 0.72 | 0.005 |
| $CO_2$ in Chlorine Product |  |  |  |  |  |  |  |
| (lbs/hr) | 153.8 | 107.1 | 106.6 | 81.9 | 136.7 | 71 | 101.9 |
| (kg/hr) | 69.8 | 48.6 | 48.4 | 37.1 | 62.0 | 32 | 46.2 |
| Solvent in Vent |  |  |  |  |  |  |  |
| (lbs/hr) | 4.3 | 0.3 | 0.5 | 0.05 | 15.8 | 1.6 | 36.1 |
| (kg/hr) | 2.0 | 0.01 | 0.2 | 0.02 | 7.2 | 0.7 | 16.4 |
| % $Cl_2$ Recovered | 97.2 | 98.4 | 97.7 | 99.9+ | 68.2 | 92.1 | 50.3 |

The table shows that 2,4-DCT recovered more chlorine than the other solvents and that less 2,4-DCT was vented.

We claim:

1. A method of removing chlorine from a mixture of gases comprising
   (a) contacting said mixture of gases with dichlorotoluene, whereby chlorine in said mixture of gases is absorbed by said dichlorotoluene;
   (b) separating said dichlorotoluene from said mixture of gases;
   (c) heating said dichlorotoluene to desorb said chlorine absorbed by said dichlorotoluene; and
   (d) separating said desorbed chlorine from said dichlorotoluene.

2. A method according to claim 1 wherein said dichlorotoluene comprises 2,4-dichlorotoluene.

3. A method according to claim 1 wherein said dichlorotoluene comprises a mixture of isomers of dichlorotoluene.

4. A method according to claim 3 wherein said dichlorotoluene comprises a mixture of 2,4-dichlorotoluene and 3,4-dichlorotoluene.

5. A method according to claim 3 wherein said dichlorotoluene comprises a mixture of 2,4-dichlorotoluene 2,6-dichlorotoluene, and 2,3-dichlorotoluene.

6. A method according to claim 1 wherein said heating is at the boiling point of said dichlorotoluene at the bottom of a stripper.

7. A method according to claim 1 wherein said mixture of gases contains about 1 to about 45 wt % chlorine.

8. A method according to claim 1 wherein the amount of said dichlorotoluene is sufficient so that, if all of said chlorine is absorbed by said dichlorotoluene, the chlorine absorbed will be about 20 to about 75% of saturation.

9. A method according to claim 1 including the additional step of recycling said dichlorotoluene from step (d) to step (a).

10. A method according to claim 1 wherein said mixture of gases in step (a) is cooled to about −10 to about 40° F.

11. A method of removing chlorine from a mixture of gases containing about 1 to about 45 wt % chlorine comprising
   (a) passing said mixture of gases up through a column of inert material;
   (b) passing dichlorotoluene down through said column, where the amount of said dichlorotoluene is sufficient to absorb all of said chlorine at about 20 to about 75% of saturation, whereby chlorine in said mixture is absorbed by said dichlorotoluene;
   (c) separating said mixture of gases from said dichlorotoluene;
   (d) heating said dichlorotoluene to its boiling point at the bottom of a stripper to volatilize chlorine from said dichlorotoluene;
   (e) separating said volatilized chlorine from said dichlorotoluene; and
   (f) recycling said dichlorotoluene to said column.

12. A method according to claim 11 wherein said dichlorotoluene comprises 2,4-dichlorotoluene.

13. A method according to claim 11 wherein said dichlorotoluene comprises a mixture of isomers of dichlorotoluene.

14. A method according to claim 11 wherein said dichlorotoluene comprises a mixture of 2,4-dichlorotoluene and 3,4-dichlorotoluene.

15. A method according to claim 11 wherein said dichlorotoluene comprises a mixture of 2,4-dichlorotoluene 2,6-dichlorotoluene, and 2,3-dichlorotoluene.

16. A method of removing chlorine from a mixture of gases containing about 1 to about 45 wt % chlorine comprising
   (a) passing said mixture of gases up through a column of inert material;
   (b) passing dichlorotoluene down through said column, where the amount of said dichlorotoluene is sufficient to absorb all of said chlorine at about 40 to about 60% of saturation, whereby chlorine in said mixture is absorbed by said dichlorotoluene;
   (c) separating said mixture from said dichlorotoluene;
   (d) heating said dichlorotoluene to its boiling point at the bottom of a stripper to volatilize chlorine from said dichlorotoluene;

(e) separating said volatilized chlorine from said dichlorotoluene; and (f) recycling said dichlorotoluene to said column.

17. A method according to claim 16 wherein said dichlorotoluene comprises 2,4-dichlorotoluene.

18. A method according to claim 16 wherein said dichlorotoluene comprises a mixture of isomers of dichlorotoluene.

19. A method according to claim 16 wherein said dichlorotoluene comprises a mixture of 2,4-dichlorotoluene and 3,4-dichlorotoluene.

20. A method according to claim 16 wherein said dichlorotoluene comprises a mixture of 2,4-dichlorotoluene 2,6-dichlorotoluene, and 2,3-dichlorotoluene.

21. A method according to claim 16 wherein, in step (d), said dichlorotoluene is under pressure and said pressure is reduced, whereby said absorbed chlorine flashes off said dichlorotoluene.

22. A method according to claim 16 wherein step (e) is performed in a condenser.

* * * * *